(12) United States Patent
Frenette et al.

(10) Patent No.: US 11,190,907 B2
(45) Date of Patent: Nov. 30, 2021

(54) SYSTEM AND METHOD FOR FACILITATING ACCESS TO ACCESS POINTS IN ACCESS CONTROL SYSTEM

(71) Applicant: Sensormatic Electronics, LLC, Boca Raton, FL (US)

(72) Inventors: Stephan Frenette, Pointe aux Trembles (CA); Gabriel Labrecque, Saint-Jean-sur-Richelieu (CA); Jean-Sebastien Decoste, St-Hubert (CA)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 15/603,836

(22) Filed: May 24, 2017

(65) Prior Publication Data

US 2018/0341393 A1    Nov. 29, 2018

(51) Int. Cl.
*H04W 12/08* (2021.01)
*H04W 4/029* (2018.01)
(Continued)

(52) U.S. Cl.
CPC .......... *H04W 4/029* (2018.02); *G06F 3/0481* (2013.01); *G06F 3/0488* (2013.01); *G06F 21/35* (2013.01); *G06F 21/604* (2013.01); *G07C 9/27* (2020.01); *G07C 9/28* (2020.01); *H04L 63/101* (2013.01); *H04L 67/22* (2013.01); *H04W 4/023* (2013.01);
(Continued)

(58) Field of Classification Search
CPC ......... G06F 17/30241; G06F 17/30265; G06F 17/30268; G06F 13/409; G06F 17/30247; G06F 17/30256; G06F 1/1632; G06F 3/0482; G06F 3/04845; G06F 17/3053; G06F 17/30705; G06F 3/04817; G06F 11/0709; G06F 11/076; G06F 11/079; G06F 11/0793; G06F 12/0813; G06F 13/28; G06F 13/364; G06F 13/372; G06F 13/385; G06F 13/4022; G06F 13/4282; G06F 15/17375;
(Continued)

(56) References Cited

U.S. PATENT DOCUMENTS

2005/0048986 A1* 3/2005 Zhao ................ H04W 48/18
                                                   455/456.1
2011/0286437 A1* 11/2011 Austin .................. H04W 4/02
                                                      370/338
(Continued)

*Primary Examiner* — Di Xiao
(74) *Attorney, Agent, or Firm* — HoustonHogle LLP

(57) ABSTRACT

An access control system includes a mobile application executing on a mobile computing device rendering a graphical user interface (GUI), which presents available access points, which are prioritized based on predictions of the next access points to be engaged. These predictions are based on prioritized lists of access points associated with times of day, days of the week and/or locations. The prioritized lists are modified based on recently selected access points, authorization status, prescribed schedules and/or prescribed sequences of access points. A selection pane of the GUI includes graphical elements associated with the access points. Graphical elements associated with the access points predicted to be next engaged by the user are displayed near the top of the selection pane. An inferred location of the user, based on the predictions, is sent to a monitoring center in response to selecting a help request option.

29 Claims, 14 Drawing Sheets

(51) Int. Cl.
*H04W 4/02* (2018.01)
*G06F 3/0488* (2013.01)
*H04L 29/06* (2006.01)
*G06F 21/35* (2013.01)
*G06F 3/0481* (2013.01)
*H04L 29/08* (2006.01)
*G06F 21/60* (2013.01)
*H04W 48/20* (2009.01)
*G07C 9/27* (2020.01)
*G07C 9/28* (2020.01)

(52) U.S. Cl.
CPC .......... *H04W 12/08* (2013.01); *H04W 48/20* (2013.01); *G06F 2221/2111* (2013.01)

(58) Field of Classification Search
CPC ... G06F 17/00; G06F 17/2235; G06F 17/2241
See application file for complete search history.

(56) References Cited

U.S. PATENT DOCUMENTS

| | | | |
|---|---|---|---|
| 2014/0278051 A1* | 9/2014 | McGavran | G06N 20/00 701/400 |
| 2014/0325290 A1* | 10/2014 | Gutjahr | G06F 11/079 714/48 |
| 2015/0057837 A1* | 2/2015 | Moore, Jr. | G06Q 30/0645 701/2 |
| 2015/0073980 A1* | 3/2015 | Griffin | G06Q 20/327 705/39 |
| 2015/0296450 A1* | 10/2015 | Koo | H04W 48/16 455/435.3 |
| 2017/0103647 A1* | 4/2017 | Davis | G06F 1/3287 |
| 2017/0193627 A1* | 7/2017 | Urmson | G06Q 50/30 |
| 2017/0300511 A1* | 10/2017 | Brewington | G06F 16/29 |
| 2017/0357904 A1* | 12/2017 | Adler | G06Q 10/109 |
| 2018/0058863 A1* | 3/2018 | Meyer | G01C 21/3676 |
| 2018/0144568 A1* | 5/2018 | Lingan | H04W 4/029 |

* cited by examiner

SYSTEM AND METHOD FOR FACILITATING ACCESS TO ACCESS POINTS IN ACCESS CONTROL SYSTEM

BACKGROUND OF THE INVENTION

Access control systems are often installed within and around buildings such as commercial, residential, or governmental buildings. Examples of these buildings include multi dwelling units, offices, hospitals, warehouses, schools or universities, shopping malls, government offices, and casinos. The access control systems typically include components such as control systems, door controller, and access control readers, to list a few examples.

The access control readers are often installed at access points of the buildings to control access to restricted areas, such as buildings or areas of the buildings. Examples of access points include front and interior doors of a building, elevators, and hallways connecting two areas of a building, to list a few examples. The access control readers authenticate identities of (or authorize) individuals and then permit those authenticated individuals to access the restricted areas through the access points. Typically, individuals engage the access control readers by swiping keycards or bringing contactless smart cards within range of a reader. The access control readers read the information of the keycards and then the access control systems determine if the individuals are authorized to access the restricted areas. If the individuals are authorized to enter the restricted areas, then the access controller allows access to the restricted areas by unlocking locked doors, signaling that doors should be unlocked, activating elevators, or generating alarms upon unauthorized entry, for example.

In addition to engaging access points by swiping keycards or presenting contactless smart cards, some access control systems also require users to enter codes on an alarm panel keypad.

To address the complexity of access control systems, and reduce the number of accessories such as keycards to be carried and the number of codes to be memorized, access control systems have been deployed that allow users to engage access points using mobile applications executing on mobile computing devices such a smart phones. These mobile applications present the user with a selectable list of access points. When the user wishes to engage an access point, they select the access point, the selection is sent by the smart phone to the control system of the access control system, and the access point is unlocked if the user is authorized.

SUMMARY OF THE INVENTION

To further reduce the complexity of access control systems and make the system more user-friendly, it would be desirable for the mobile applications to discriminate how and which access points are presented to the user.

The current invention can involve a mobile application that presents a prioritized list of only those access points which the user is authorized to access. Additionally, the access points that are presented to the user are further prioritized based on predictions of which access points are most likely to be the next access point engaged by the user. The predicted access points can be presented as preeminent icons such that they are easy to access.

These predictions can be based on learned patterns in the user's past behavior, including the access points that the user typically engages at various times of the day, days of the week, and/or at various locations. In this way, the longer that the user employs the mobile application, the better it understands their habits.

The predictions can be further refined by other factors such as: which were the most recently engaged access points by the user, and whether a prescribed sequence and/or schedule of access points exists for the user.

In one example, it is known that at 5:00 pm the user typically leaves the building through a sequence of access points and then enters a parking garage through another access point. The mobile application will know this pattern and present unlock icons for those access points, in the correct sequence, to the user.

A "help request" feature can also be included in the mobile application. By selecting this feature, for example, by holding down a virtual button representing an access point on the graphical user interface, or by pressing a virtual button specifically representing the "help request" feature, a monitoring center of the access control system can be alerted and maintenance and/or security personnel can be dispatched to the user's location, which can be either inferred or detected using an indoor tracking system and/or global navigation satellite system.

The behavior learning functionality, on which the prioritized lists are based, is used to precisely infer the user's location. For example, if the user has recently engaged a first access point before activating a "help request", the system can infer that the user is between the first access point and a second access point predicted to be the next access point engaged by the user. This inferred location is then sent to the monitoring center, which can dispatch assistance or initiate video surveillance of the inferred location, among other examples.

In general, according to one aspect, the invention features a system for facilitating access by users through access points in an access control system. A control system controls access through the access points, and mobile applications, executing on mobile computing devices, render graphical user interfaces on touchscreen displays of the mobile computing devices. The graphical user interfaces indicate available access points and receive input from the users indicating which access points to engage, and the available access points indicated by the graphical user interfaces are prioritized based on predictions of the next access points to be engaged by the users.

In embodiments, the predictions of the next access points to be engaged by the users are based on which access points were recently engaged by the users, which access points were engaged by the users at the same time on previous days and/or which access points were previously engaged by the users at the users' current locations, a prescribed schedule, prescribed sequences of access points for the users, and/or which access points the users are authorized to engage.

With regard to the predictions based on the access points previously engaged by the users at the users' current locations, the mobile computing devices can further comprise local position detectors for determining the current locations of the users in confluence with a local positioning system.

Prioritized lists of access points are maintained for the users and are associated with different times and/or potential locations of the users. These prioritized lists are updated in response to the users engaging access points that are not included on the prioritized lists.

The graphical user interfaces comprise selection panes for displaying graphical elements associated with the available access points. Graphical elements that are associated with access points predicted with higher levels of confidence to be the next access points to be engaged by the users are displayed closer to the top of the selection panes, and graphical elements that are associated with access points predicted with lower levels of confidence to be the next access points to be engaged by the users are displayed closer to the bottom of the selection panes. In other cases, graphical elements associated with access points predicted with the highest levels of confidence to be the next access points to be engaged by the users are the only graphical elements included in the selection panes. The graphical elements include icons and/or text identifying the access points associated with the graphical elements.

The mobile computing devices can be smart phones and/or smart watches.

In general, according to another aspect, the invention features a method for facilitating access by users through access points in an access control system. Mobile applications executing on mobile computing devices display graphical user interfaces indicating access points available to the users, the mobile applications detect selections by the users of which access points to engage and send the selections to a control system, and the control system controls access through the access points. The access points presented to the users are prioritized based on predictions of the next access points to be engaged by the users.

In general, according to another aspect, the invention features a method for assisting users in an access control system. Mobile applications executing on mobile computing devices receive input from the users indicating which access points to engage. Inferred location information of the users is generated based on predictions of the next access points to be engaged by the users and previously engaged access points by the users. The inferred location information is then sent to a monitoring center in response to the mobile applications receiving input from the users indicating that help is requested.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
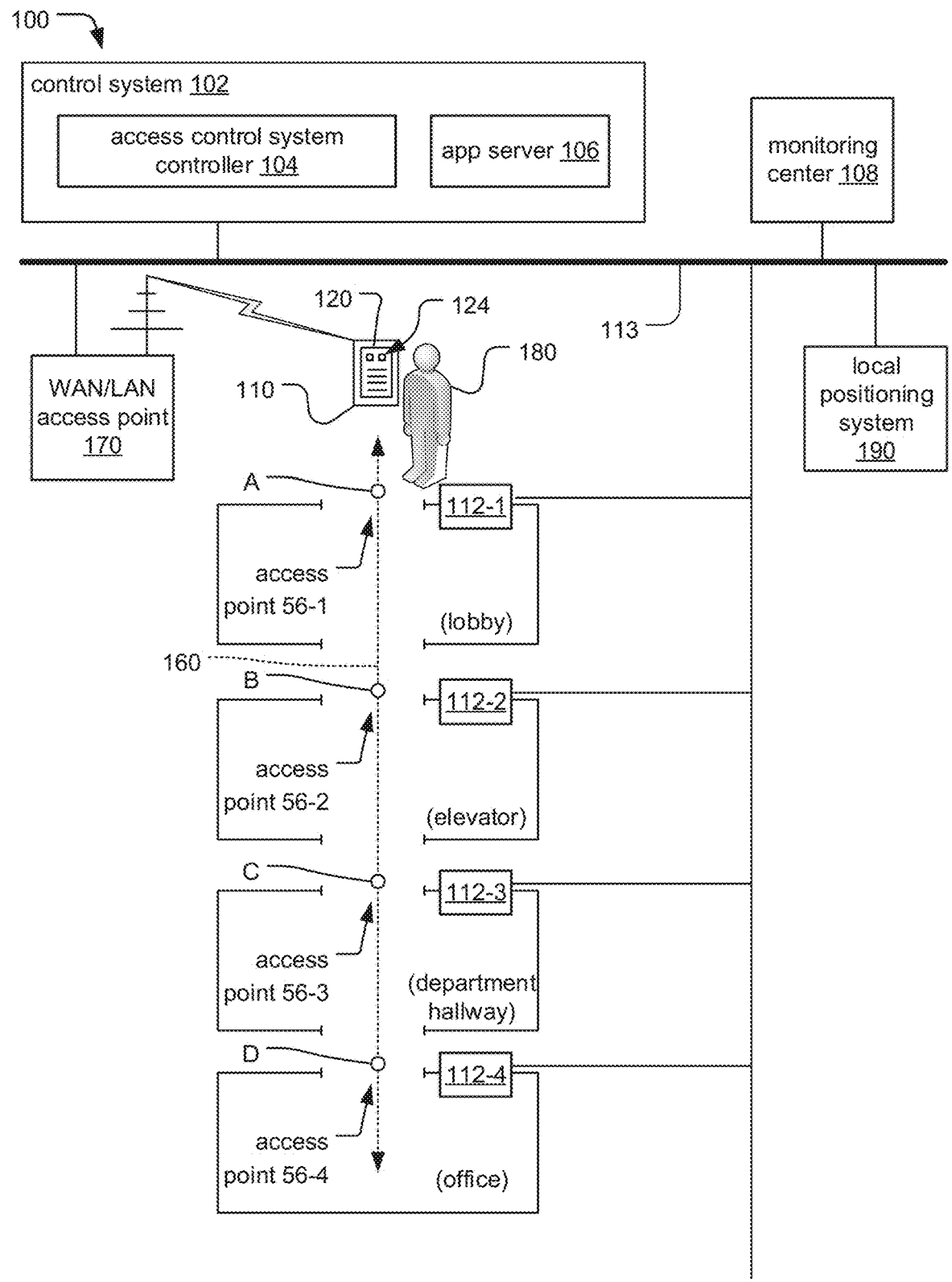
FIG. 1 is a schematic diagram of an exemplary access control system to which the current invention is directed.

FIG. 1 is a schematic diagram of an exemplary access control system 100 to which the current invention is directed. The access control system 100 enables access to restricted areas of a premises such as a building.

In the illustrated example, the access control system 100 includes a control system 102, a series of access points 56 and access point controllers 112, and a mobile computing device 110 operated by a user 180. In practice, access control systems 100 according to the current invention would include several to hundreds of mobile computing devices 110 operated by corresponding users 180.

The control system 102, including an access control system controller 104 and an app server 106, controls access through the access points 56. The app server 106 sends information to and receives user credentials and selections of access points 56 from the mobile computing device 110. The access control system controller 104 validates the user credentials, including whether the user is authorized to access specific access points 56, and sends instructions to the access point controllers 112 to open or unlock the selected access points 56.

The access points 56 are controlled portals, such as doors or elevators, leading to restricted areas of the premises. In the illustrated example, four access points 56 are schematically depicted to show an exemplary path from position A to position B to position C to position D through a premises. Position A is at access point 56-1, which is a front door of a building leading to a lobby. Position B is at access point 56-2, which is an elevator. Position C is an access point 56-3, which is a door leading to a hallway of, for example, a particular department of a company occupying the premises. Position D is at access point 56-4, which is a door leading to an individual office belonging to the user 180.

The access point controllers 112 are installed at each access point 56 and open or unlock the access points 56 in response to receiving instructions from the access control system controller 104. In the illustrated example, access point controller 112-1 unlocks access point 56-1, access point controller 112-2 unlocks or provide operability to elevator access point 56-2, access point controller 112-3 unlocks access point 56-3, and access point controller 112-4 unlocks access point 56-4.

The mobile computing device 110 presents access points 56 to the user 180 and receives user selections of access points 56 via a graphical user interface (GUI) 124 rendered on a touchscreen display 120 and sends the selections of access points 56 to the control system 102. In the illustrated example, the mobile computing device 110 is a smartphone device. Alternatively, the mobile computing device 110 could be a laptop computer, tablet computer, phablet computer (i.e., a mobile device that is typically larger than a smart phone, but smaller than a tablet), or smart watch, to list a few examples. Typically, such device operation IOS operating system Apple Corp. or Android operating system from Google, Inc.

The control system 102, mobile computing device 110 and access point controllers 112 communicate via a data network 113. Typically, the data network 113 is an enterprise network such as a Local Area Network (LAN), e.g. wired and/or wireless Ethernet, which can also be connected to or include a Wide Area Network (WAN) or a public network such as the internet, or a mobile broadband or cellular network. Specifically, the mobile computing device 110 connects to the data network 113 via a wireless link to a WAN/LAN access point 170, which provides WiFi and/or cellular data connectivity to the data network 113.

Additionally, the access control system 100 includes a monitoring center 108, which receives status information from the control system 102 and help requests from the mobile computing devices 110 and coordinates responses to the help requests.

Finally, a local positioning system 180 installed in and/or throughout the premises communicates with the mobile computing devices 110 in order to generate location information for the mobile computing devices 110.

Figure 2:
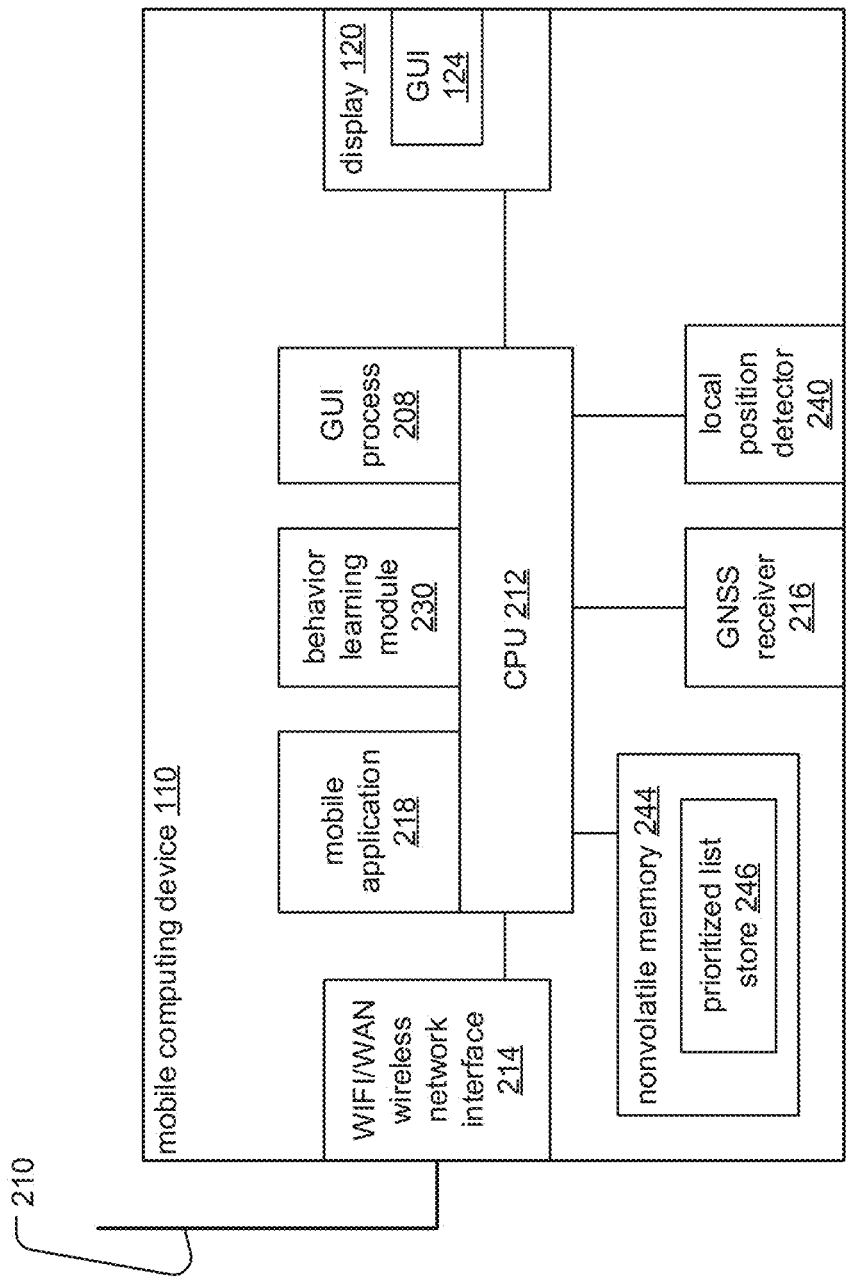
FIG. 2 is a block diagram of a mobile computing device.

FIG. 2 is a block diagram of the mobile computing device 110. The device includes a CPU 212, a display 120, a local position detector 240, a global navigation satellite system (GNSS) receiver 216, nonvolatile memory 244, a WiFi/WAN wireless network interface 214, and an antenna 210.

The CPU 212 executes firmware/operating system instructions and sends instructions and data to and receives data from the wireless network interface 214, local position detector 240, GNSS receiver 216, nonvolatile memory 244, and a touchscreen display 120. Executing on typically an operating system of the CPU 212 are a behavior learning module 230, a mobile application 218, and a GUI process 208.

The mobile application 218 renders the GUI 124 on the display 120 via the GUI process 208. The GUI 124 displays information such as identifying information for access points 56 to the user and receives user input such as selections of access points 56 to engage.

Some of the information displayed by the mobile application 218 is received from the app server 106 via the wireless network interface 214 and the antenna 210. The wireless network interface 214 sends and receives information to the data network 113 via a wireless communication link to the WAN/LAN access point 170. Information, including input received from the user 180 via the GUI 124, is also sent to the app server 106 via the wireless network interface 214.

The access points 56 presented to the user 180 via the GUI 124 are prioritized by the mobile application 218 based on predictions of the next access points 56 to be engaged by the user 180. These predictions are based in part on information generated by the behavior learning module 230, which, in general, maintains prioritized lists of previously engaged access points 56 that are indexed by the time of the day, day of the week, and/or location information of the user 180. These prioritized lists are stored on and retrieved from a prioritized list store 246 in the nonvolatile memory 244.

The GNSS receiver 216 and local position detector 240 (in confluence with the local positioning system 190) send positioning information to the CPU 212, which uses the positioning information to generate location information, which is information about the current location of the mobile computing device 110. The positioning information can include positioning signals from GNSS satellites (such as GPS satellites) and/or the local positioning system 190 as well as detected motion and/or image information from the environment. However generated, the location information is used by the behavior learning module 230 to generate the prioritized lists of access points 56.

Figure 3:
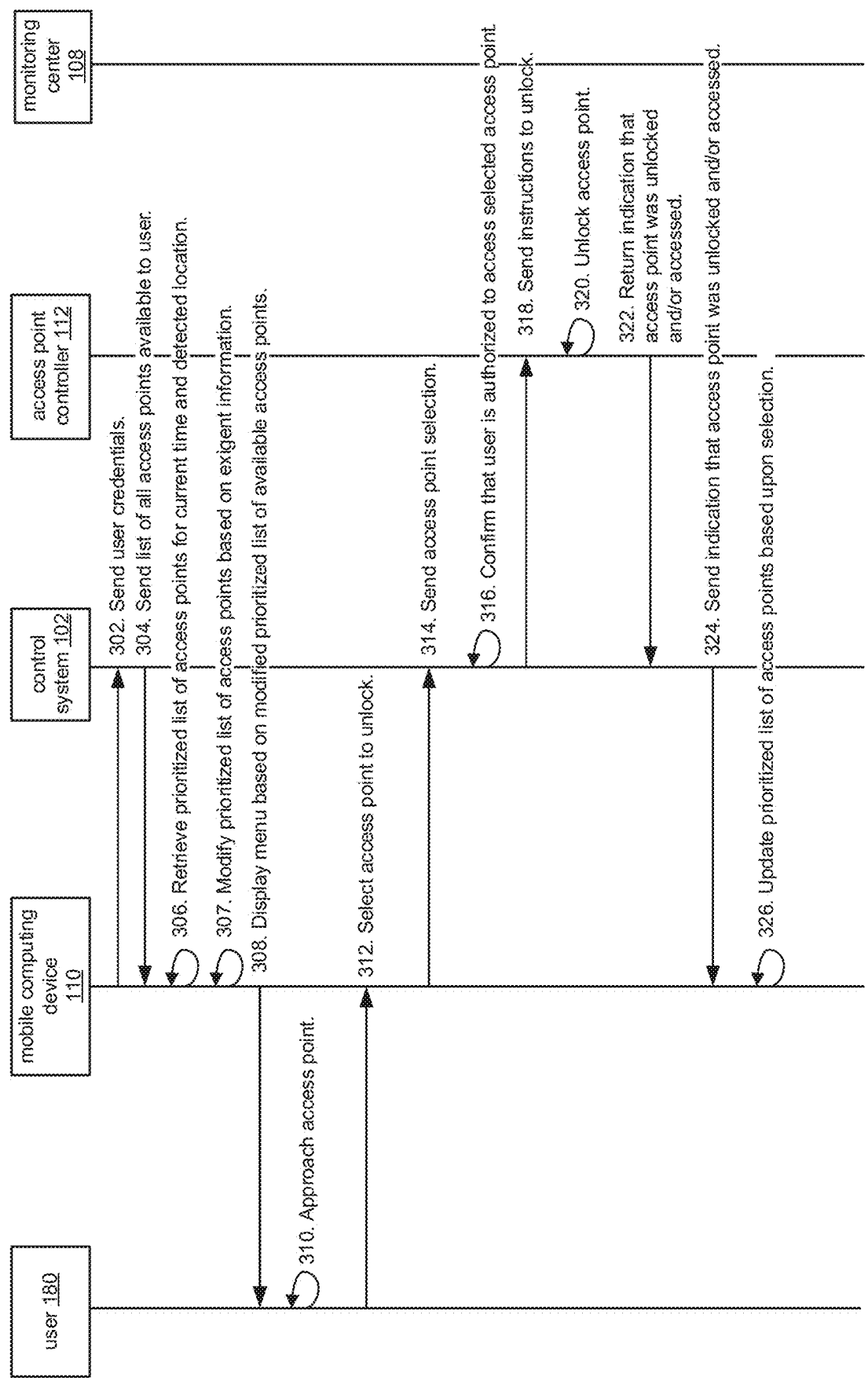
FIG. 3 is a sequence diagram illustrating the process by which the mobile application facilitates access by the user through the access points.

FIG. 3 is a sequence diagram illustrating the process by which the mobile application facilitates access by the user 180 through the access points 56.

In step 302, the mobile computing device 110 sends user credentials of the user 180 to the control system 102. The user credentials can include a unique user ID for the user 180 and/or other information for authorizing the user such as a username/password, or a token or a hash of the token generated for the user 180, which may or may not expire after a predetermined time.

In step 304, in response to receiving the user credentials the control system 102 sends a list of all of the access points 56 that are available to the user 180 and which the user 180 is authorized to pass through.

In step 306, a prioritized list of access points 56 associated with the current time of day, day of the week and/or location of the user 180 is retrieved from the prioritized list store 246 by the mobile application 218 via the behavior learning module 230. As previously discussed, these prioritized lists include access points 56 that were previously engaged by the user 180, indexed by time and location. The prioritized list that most closely matches the current time and location is retrieved. Thus, the prioritized list includes access points 56 predicted to be the next access points 56 engaged by the user 180 based on previously engaged access points 56.

Then, in step 307, the prioritized list is further modified based on exigent information such as whether access points 56 were recently engaged by the user 180, a prescribed schedule, a prescribed sequence of access points 56, and/or which access points 56 the user 180 is currently authorized to access.

In step 308, the mobile application 218 displays a selectable menu of access points 56 via the GUI 124, and in step 310, the user 180 approaches the desired access point 56 and, in step 312, selects the desired access point 56 via the GUI 124. The access point 56 selection is sent by the mobile computing device 110 to the control system 102 in step 314. In step 316, the control system 102 confirms that the user 180 is authorized to access the selected access point 56 based on the user credentials received from the mobile computing device and, for example, a verification database.

In step 318, after it is confirmed that the user 180 is authorized to access the selected access point 56, the control system 102 sends instructions to unlock to the access point controller 112 associated with the selected access point 56. In step 320, the access point controller 112 unlocks the access point 56.

Next, in step 322, an indication that the access point was unlocked and/or accessed is sent from the access point controller 112 to the control system 102, and from the control system 102 to the mobile computing device 110, in step 324.

In step 326, the prioritized list is updated based on the selection of the user 180. In this way, the prioritized lists are continuously maintained and improved over time as the user 180 continues to engage more and more access points 56.

It should be noted that the steps of retrieving the prioritized list (step 306), modifying the prioritized list based on exigent information (step 307) and displaying the menu based on the modified prioritized list (step 308) are completed on a continual basis such that the menu displayed by the mobile application 218 always includes access points 56 predicted to be the next access points 56 engaged by the user 180 based on the user's current time and location.

Figure 4:
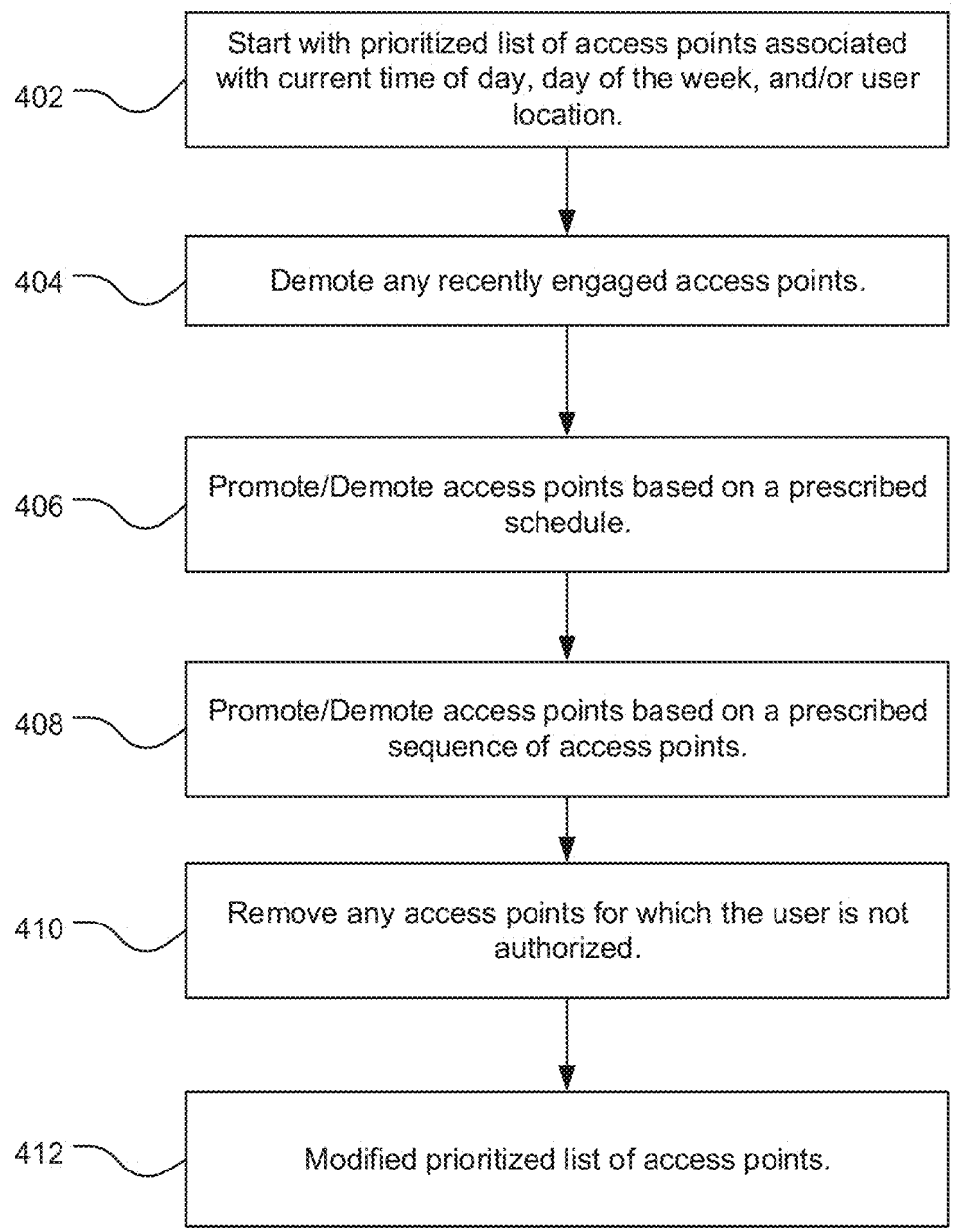
FIG. 4 is a flow diagram illustrating the process by which the prioritized list is modified based on exigent information.

FIG. 4 is a flow diagram illustrating the process by which the prioritized list is modified based on exigent information. This process corresponds to step 307 from FIG. 3.

First, the process begins in step 402 with the prioritized list of access points 56 associated with the current time of day, day of the week and/or user location that was retrieved from the prioritized list store 246. In general, access points 56 included in this prioritized list will be promoted or demoted in the prioritized list, indicating that the confidence level of the predictions that the access points 56 will be the next access point 56 engaged by the user 180 either increases or decreases, respectively. Access points 56 that are promoted during this process are determined to have a higher likelihood of being the next access point 56 engaged by the user 180, and access points 56 that are demoted during this process are determined to have a lower likelihood of being the next access point 56 engaged by the user 180.

In step 404, access points 56 that were recently engaged by the user 180 are demoted. In this way, the predictions of the next access points 56 are based upon an assumption that an access point 56 that was just engaged will not immediately be engaged by the user 180 again.

In step 406, access points 56 are promoted and/or demoted based on a prescribed schedule. In embodiments, the prescribed schedule can be stored on the control system 102 and pushed to the mobile computing device 110 or can be stored on the mobile computing device 110. Access points 56 can be prioritized based on an event, schedule or condition, for example, in the access control system 100 or in the mobile computing device 110. Examples include a maintenance schedule for the premises, a security event generated by the access control system 100 or a connected security system, a conference room registration schedule, or a personal calendar for the user 180.

In step 408, access points 56 are promoted and/or demoted based on a prescribed sequence of access points 56. For example, after having engaged access point 56-1, access point 56-2 can be prioritized, and after having engaged access point 56-2, access point 56-3 can be prioritized.

In step 410, access points 56 for which the user 180 is not authorized are removed from the prioritized list. In this way, only access points 56 that are available are presented to the user 180, and if the authorization status for certain access points 56 or users 180 changes, the modified prioritized list will reflect the updated authorization status.

Finally, in step 412, the process results in the modified prioritized list of access points 56, which reflects a further refined version of the prioritized list retrieved from the prioritized list store 246.

Figure 5:
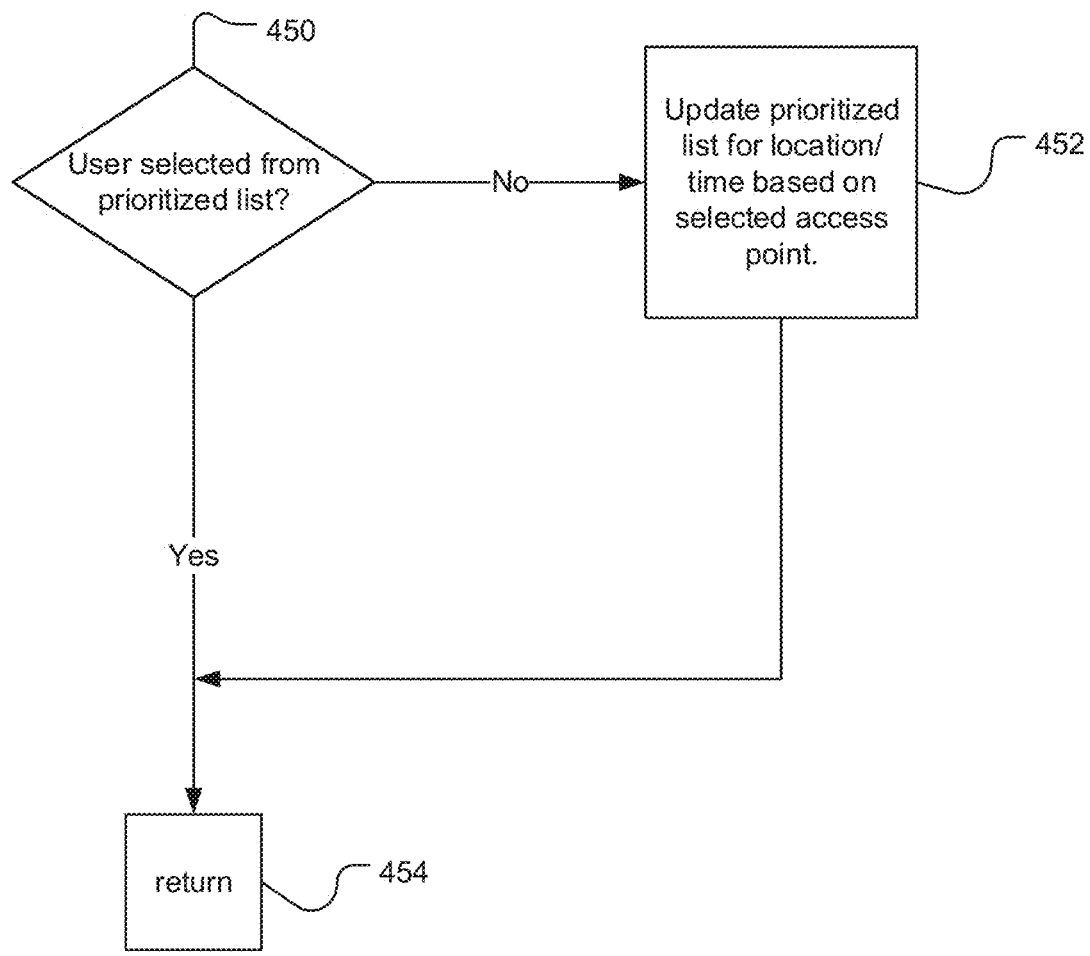
FIG. 5 is a flow diagram illustrating the process by which the prioritized list is updated based on the user's most recent selection.

FIG. 5 is a flow diagram illustrating the process by which the prioritized list is updated based on the user's 180 most recent selection. This process corresponds to step 326 from FIG. 3.

In step 450, it is determined whether the selected access point 56 was already included on the prioritized list associated with the current time of day, day of the week and/or location. If it was, no changes are made. However, if it was not, in step 452, the prioritized list associated with the current time of day, day of the week and/or location is updated to include the selected access point 56. The process returns in step 454.

In this way, the behavior learning module 230 maintains the prioritized lists, updating them whenever a selection is made that was not already included on the lists. As the user 180 makes more and more selections and more and more information about the user's 180 habits is collected, the predictions of which access point 56 will be the next access point 56 engaged by the user 180 become increasingly refined.

Figure 6A:
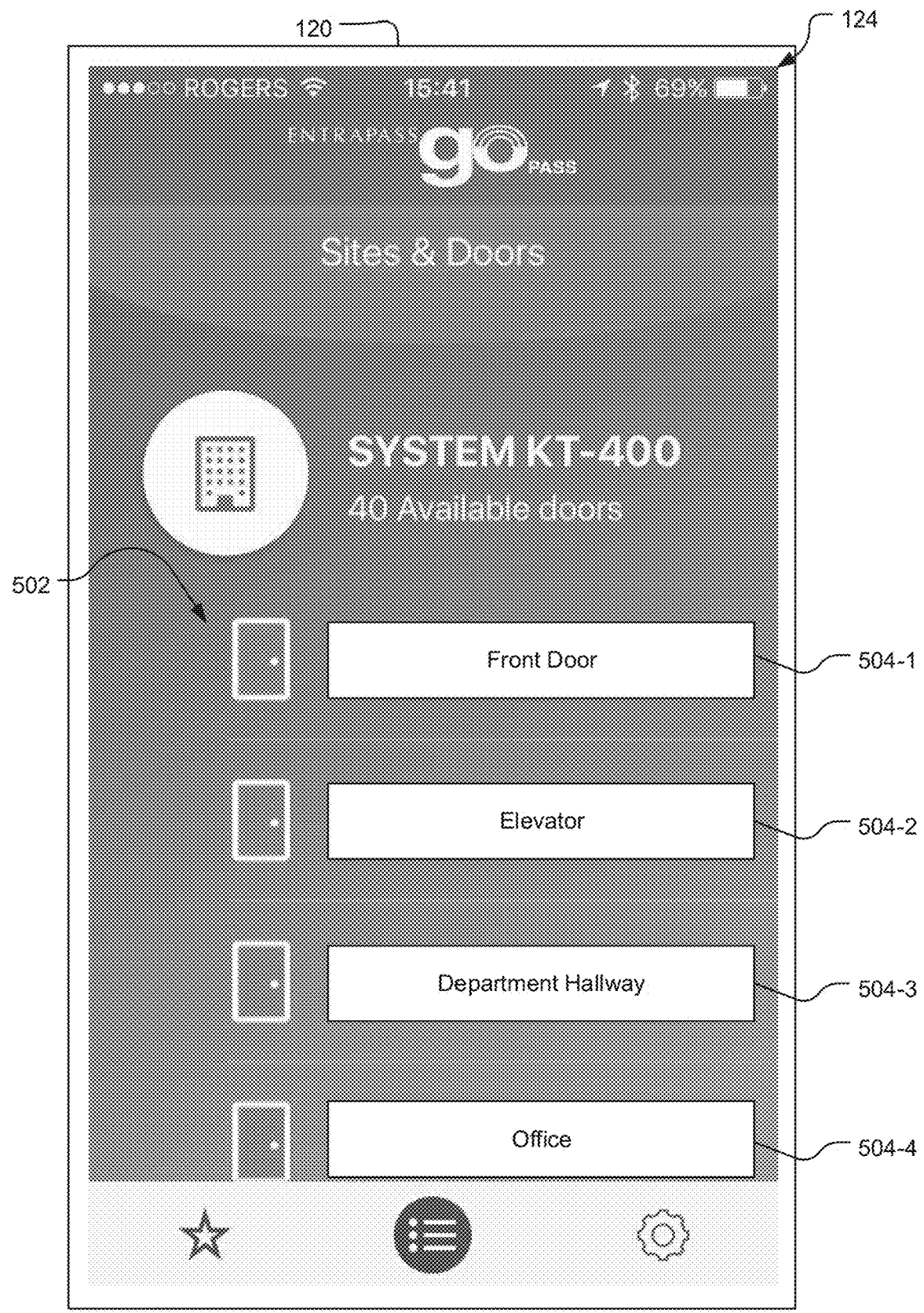
FIG. 6A shows an example of a screen of the graphical user interface that is displayed on the display of the mobile computing device, presenting the prioritized access points when the user is at a first position.

FIG. 6A shows an example of a screen of the GUI 124 that is displayed on the touch-screen display 120 of the mobile computing device 110 presenting the prioritized access points 56 to the user 180. This screen would be displayed, for example, in step 308 from FIG. 3.

The screen includes identifying text about the access control system 100, including a system name and a number of available access points. Also included is a selection pane 502, which is a region of the screen containing a series of selectable graphical elements corresponding to access points 56. Each graphical element 504 includes a combination of an icon (for example, a graphical depiction of a door) and text identifying the access point 56 with which the graphical element 504 is associated. Selection of the graphical elements 504 is indicated when contact (for example, with a finger of the user 180) is detected by the display 120 in the region containing the graphical elements 504. In this way, the graphical elements 504 function as virtual buttons that can be "pushed" by the user 180.

In general, graphical elements 504 appear in the selection pane 502 sorted by the likelihood of access points 56 to be the next access point 56 engaged by the user 180. Thus, graphical elements 504 associated with access points 56 that are predicted with higher levels of confidence to be the next access point 56 to be engaged by the user 180 are displayed closer to the top of the selection pane 502. Likewise, graphical elements 504 associated with access points 56 that are predicted with lower levels of confidence to be the next access point 56 to be engaged by the user 180 are displayed closer to the bottom of the selection pane 502.

In the illustrated example, graphical element 504-1 is associated with access point 56-1, graphical element 504-2 is associated with access point 56-2, graphical element 504-3 is associated with access point 56-3, and graphical element 504-4 is associated with access point 56-4.

The screen depicted in FIG. 6A is the screen that would be displayed when the user 180 is at position A on FIG. 1. The order of graphical elements 504 in the selection pane 502 indicates that the front door, access point 56-1, is predicted to have the highest likelihood of being the next access point 56 engaged by the user 180. The elevator, access point 56-2, is predicted to have the second highest likelihood of being the next access point 56 engaged by the user 180. The department hallway, access point 56-3 is predicted to have the third highest likelihood of being the next access point 56 engaged by the user 180. The office, access point 56-3, is predicted to have the fourth highest likelihood of being the next access point 56 engaged by the user 180. Other graphical elements 504 associated with other access points 56 could be revealed by scrolling down in the selection pane 502 (for example, by the user 180 dragging a finger vertically across display 120 from a point at the bottom the selection pane 502 towards a point at the top of the selection pane 502).

As previously discussed, the predictions of which access point 56 will be the next access point 56 engaged by the user 180, as well as any quantified confidence levels associated with each prediction, can be based any or a combination of: the prioritized lists maintained for different times of day, days of the week, and/or locations, recently engaged access points 56, a prescribed schedule, a prescribed sequence of access points 56, and which access points 56 the user 180 is authorized to access. More specifically, this prediction is based on the fact that access point 56-1 is included on the prioritized list associated with the current time of day, day of the week and/or location (for example, 8:55 AM on Tuesday in the vicinity of the premises, which is a pattern detected by the behavior learning module 230 corresponding to the user's 180 routine arrival at work at the premises in the morning).

Figure 6B:
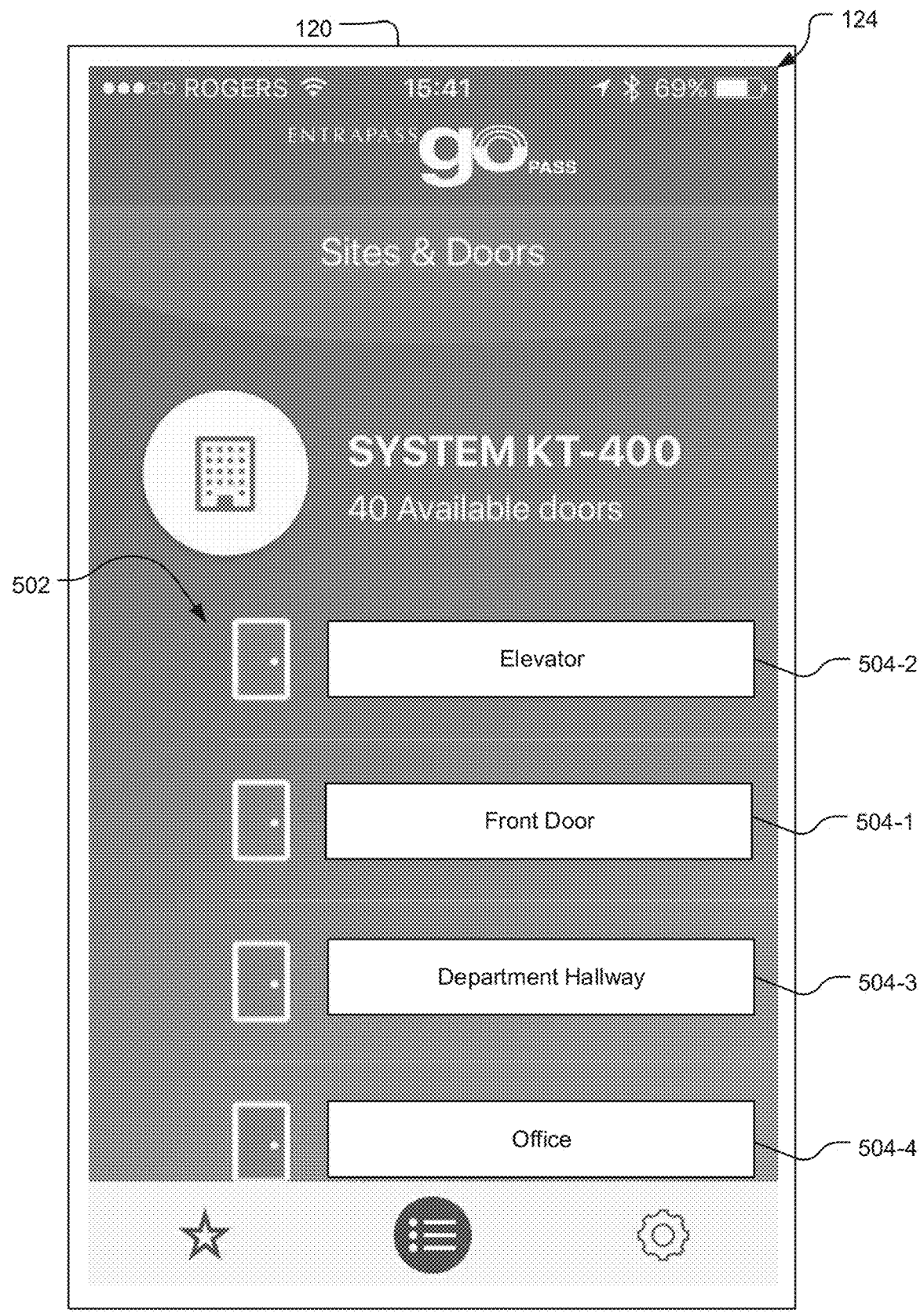
FIG. 6B shows an example of how the screen presents different prioritized access points when the user is at a second position.

FIG. 6B shows an example of a screen that is displayed when the user is at position B, between access points 56-1 and 56-2.

Now, the order of the graphical elements 504 in the selection pane 502 has been changed to reflect updated predictions for which access point 56 will be the next access point 56 to be engaged by the user 180. Specifically, graphical element 504-1, associated with access point 56-1, has been demoted and now appears as the second graphical element 504 in the selection pane 502. Graphical element 504-2, associated with access point 56-2, has been promoted and now appears as the first graphical element 504 in the selection pane 502. This reflects that the elevator, access point 56-2, is predicted to be the access point 56 most likely to be next engaged by the user 180.

This prediction, as previously discussed, is based on the fact that access point 56-2 is included on the prioritized list associated with the current time of day, day of the week and/or location (for example, 9:05 AM on Tuesday in the vicinity of the premises) as well as the fact that access point 56-1 has just been engaged (and has thus been demoted) and/or the fact that a prescribed sequence of access points 56 pushed from the control system 102 indicates that after engaging with access point 56-1, access point 56-2 should be prioritized, among other factors.

Figure 6C:
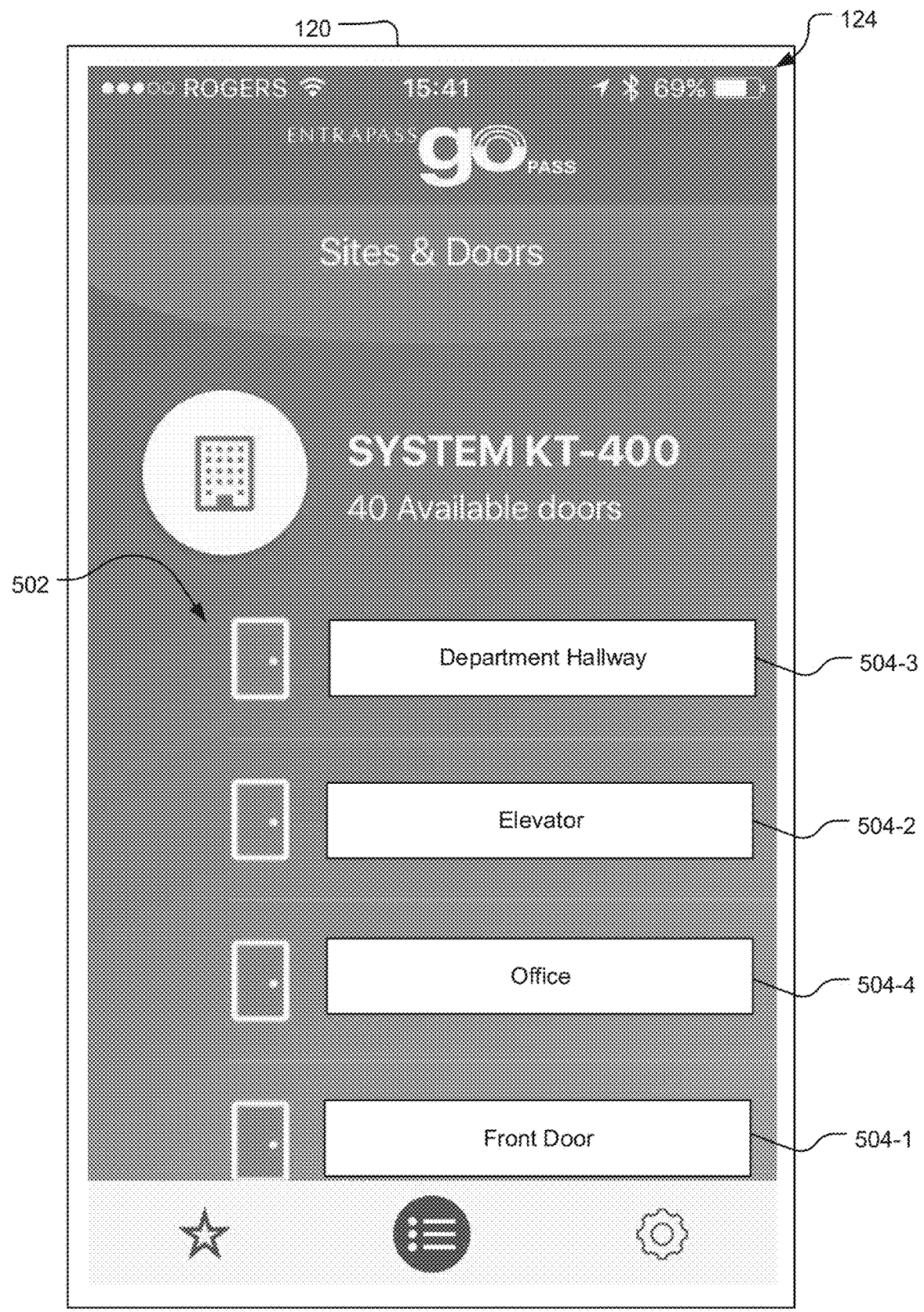
FIG. 6C shows an example of how the screen presents different prioritized access points when the user is at a third position.

FIG. 6C shows an example of a screen that is displayed when the user is at position C, between access points 56-2 and 56-3.

As before, the order of the graphical elements 504 in the selection pane 502 has been changed to reflect updated predictions for which access point 56 will be the next access point 56 to be engaged by the user 180. Specifically, graphical element 504-2, associated with access point 56-2, has been demoted and now appears as the second graphical element 504 in the selection pane 502. Graphical element 504-3, associated with access point 56-3, has been promoted and now appears as the first graphical element 504 in the selection pane 502. Graphical element 504-1 has also been demoted to the fourth graphical element 504 in the selection pane 502, and graphical element 504-4 has been promoted to the third graphical element 504 in the selection pane 502. This reflects that the department hallway, access point 56-3, is predicted to be the access point 56 most likely to be next engaged by the user 180.

This prediction, as previously discussed, is based on the fact that access point 56-3 is included on the prioritized list associated with the current time of day, day of the week and/or location (for example, 9:10 AM on Tuesday in the vicinity of the premises) as well as the fact that access point 56-2 has just been engaged (and has thus been demoted) and/or the fact that a prescribed sequence of access points 56 pushed from the control system 102 indicates that after engaging with access point 56-2, access point 56-3 should be prioritized, among other factors.

Figure 6D:
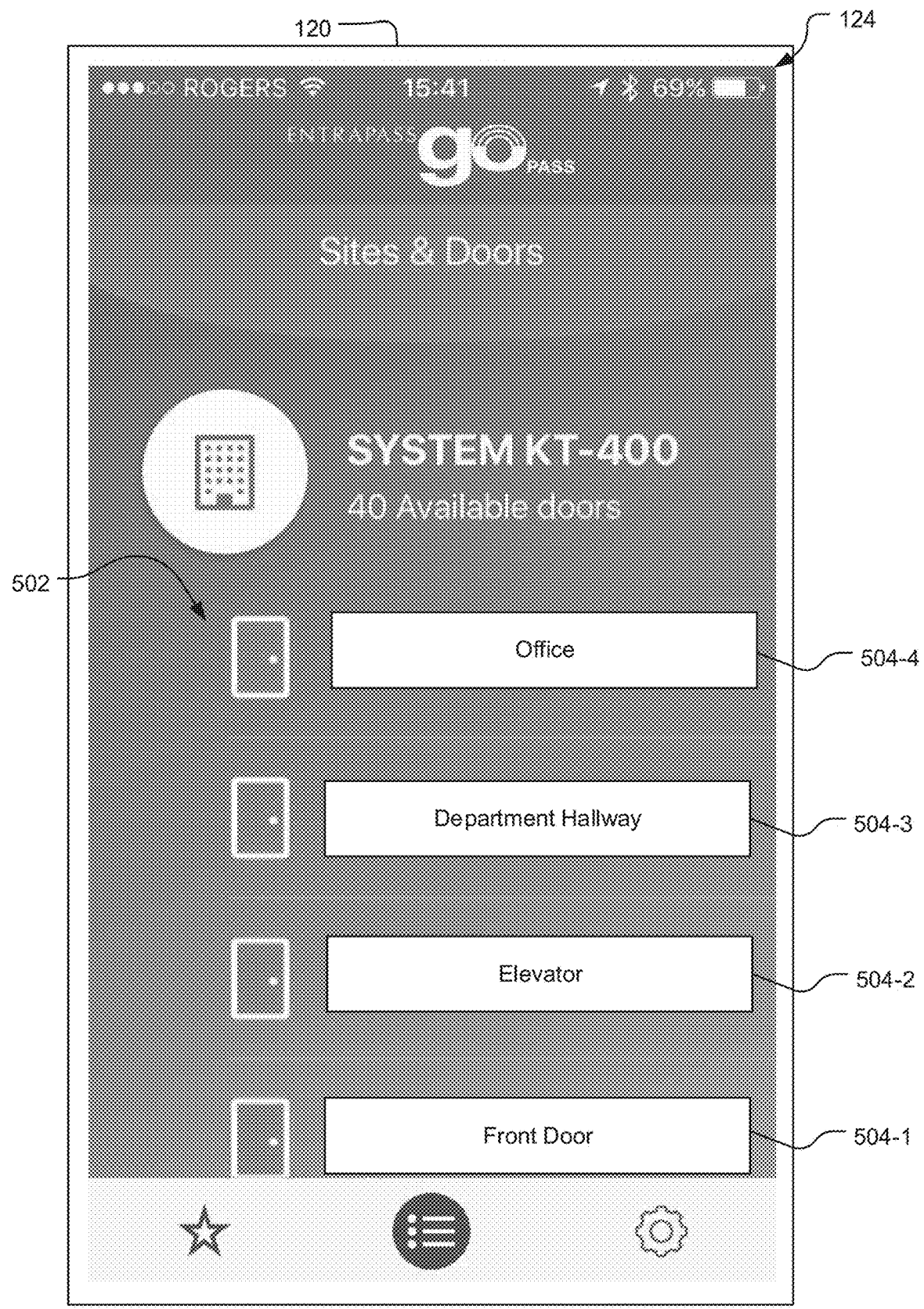
FIG. 6D shows an example of how the screen presents different prioritized access points when the user is at a fourth position.

FIG. 6D shows an example of a screen that is displayed when the user is at position D, between access points 56-3 and 56-4.

As before, the order of the graphical elements 504 in the selection pane 502 has been changed to reflect updated predictions for which access point 56 will be the next access point 56 to be engaged by the user 180. Specifically, graphical element 504-3, associated with access point 56-3, has been demoted and now appears as the second graphical element 504 in the selection pane 502. Graphical element 504-4, associated with access point 56-4, has been promoted and now appears as the first graphical element 504 in the selection pane 502. Graphical element 504-3 has also been demoted to the third graphical element 504 in the selection pane 502. This reflects that the office, access point 56-4, is predicted to be the access point 56 most likely to be next engaged by the user 180.

This prediction, as previously discussed, is based on the fact that access point 56-4 is included on the prioritized list associated with the current time of day, day of the week and/or location (for example, 9:15 AM on Tuesday in the vicinity of the premises) as well as the fact that access point 56-3 has just been engaged (and has thus been demoted) and/or the fact that a prescribed sequence of access points 56 pushed from the control system 102 indicates that after engaging with access point 56-3, access point 56-4 should be prioritized, among other factors.

Figure 7:
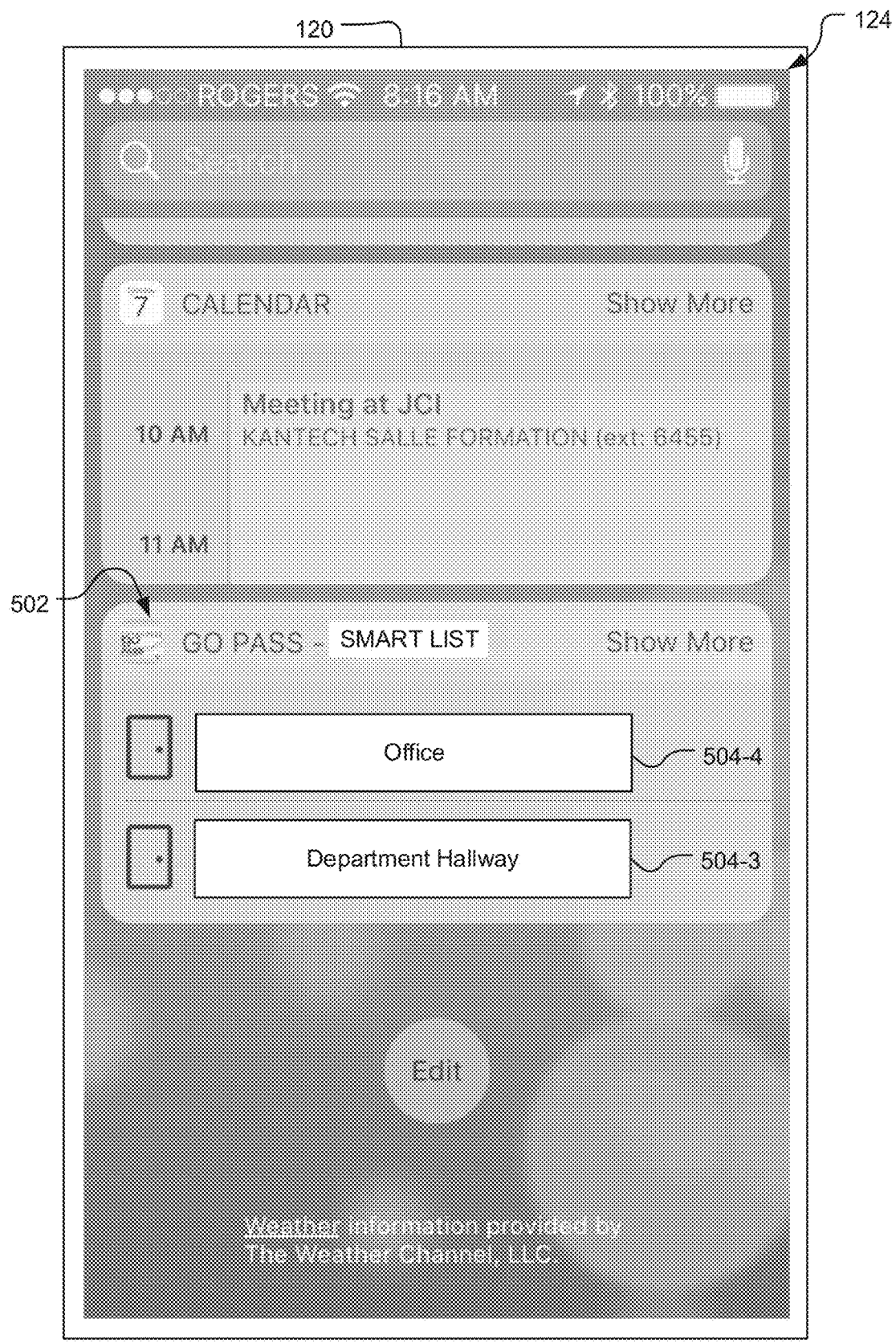
FIG. 7 shows a first alternative example of a screen of the graphical user interface.

FIG. 7 shows an alternative example of a screen of the GUI 124. In this example, the selection pane 502 is embedded as a "widget" on a general menu screen (for example, displayed by an operating system as opposed to the mobile application 218) of a smart phone. The selection pane 502 includes graphical elements 504-4 and 504-3 associated with access points 56-3 and 56-4, respectively.

Figure 8:
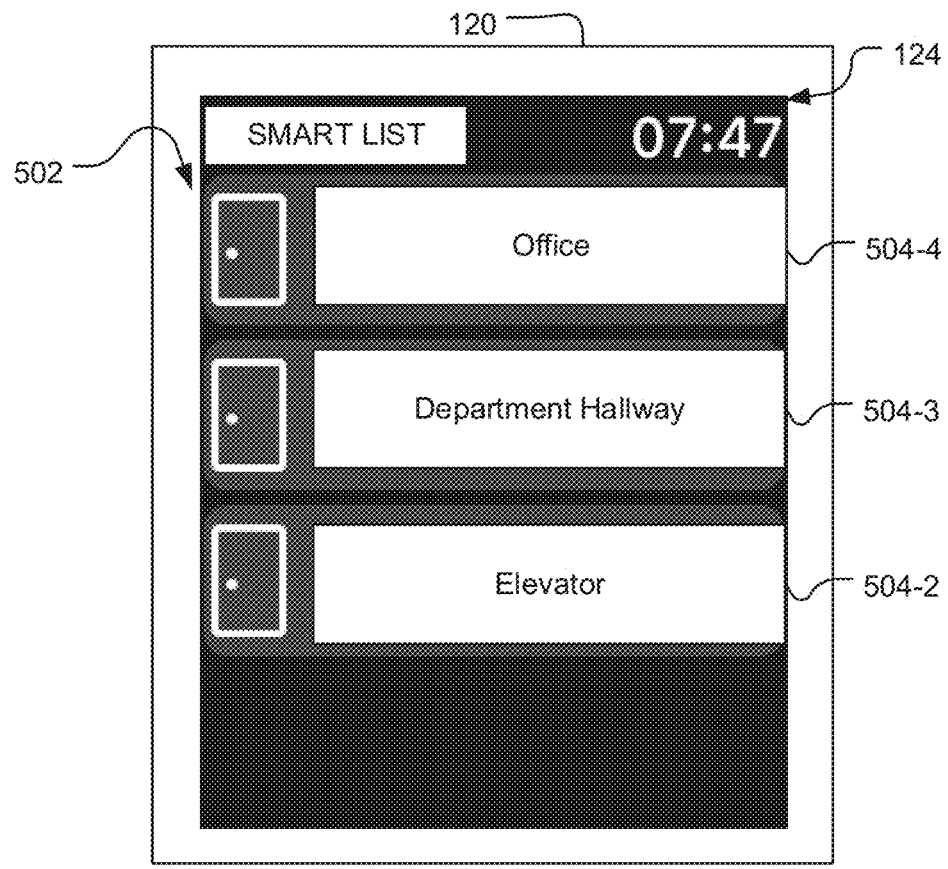
FIG. 8 shows a second alternative example of a screen of the graphical user interface.

FIG. 8 shows another alternative example of a screen of the GUI 124. In this example, the selection pane 502 is displayed by the mobile application 218, which is executing on a smart watch. The selection pane 502 includes graphical elements 504-4, 504-3, and 504-2 associated with access points 56-4, 56-3 and 56-2, respectively.

Figure 9:
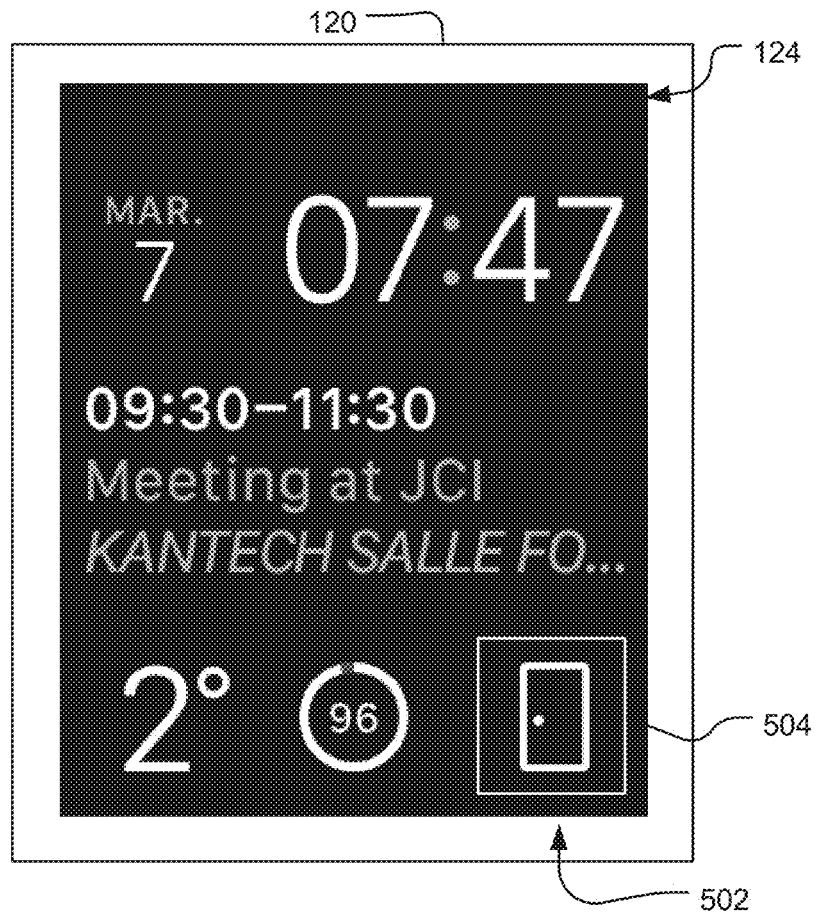
FIG. 9 shows a third alternative example of a screen of the graphical user interface.

FIG. 9 shows another alternative example of a screen of the GUI 124. In this example, the selection pane 502 is embedded as a "widget" on a general menu screen (for example, displayed by an operating system as opposed to the mobile application 218) of a smart watch. Here, the selection pane 502 includes only a single graphical element 504 in the form of a single icon representing a door. The graphical element 504 represents the access point 56 predicted to have the highest likelihood of being the next access point 56 to be engaged by the user 180.

Figure 10:
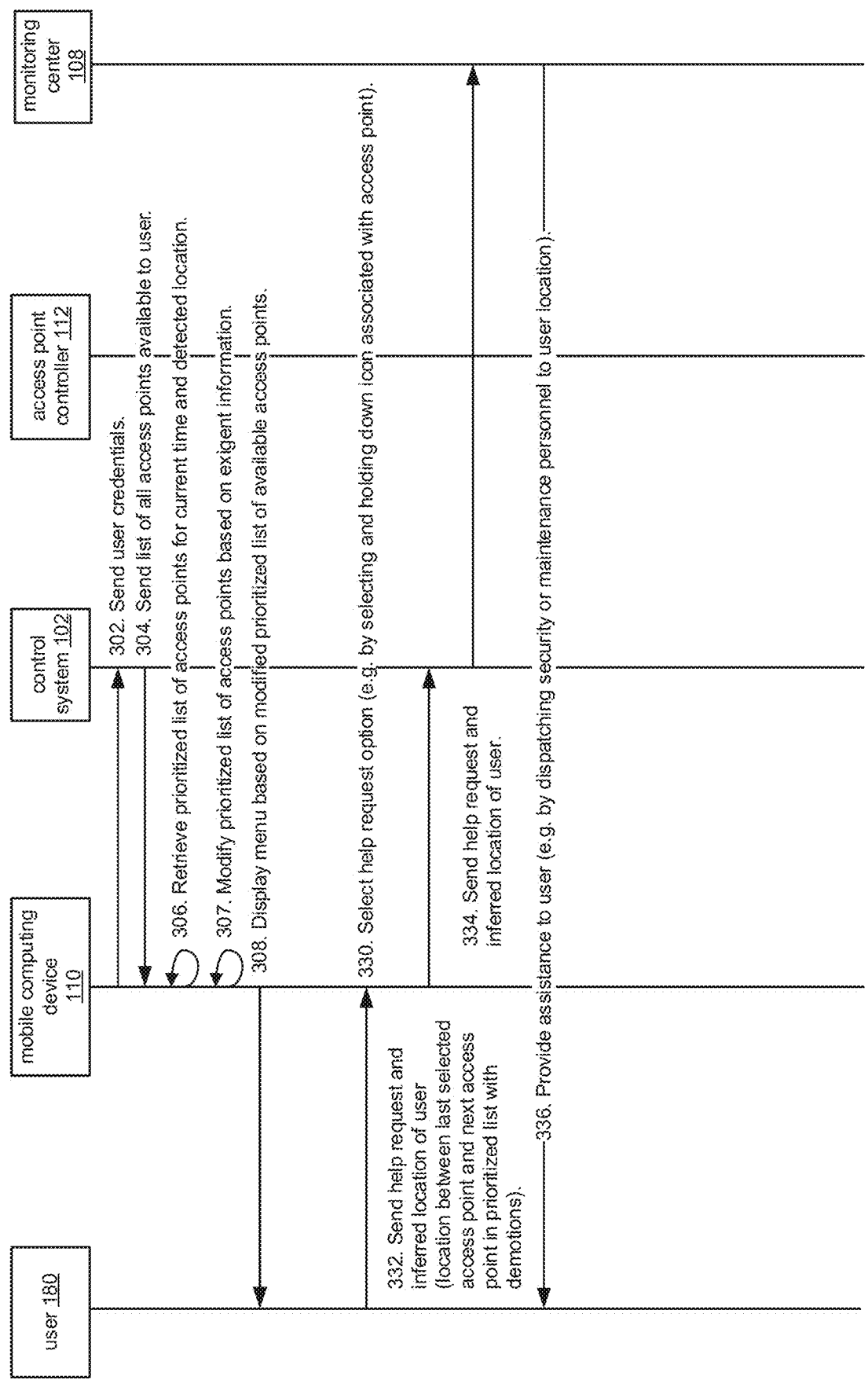
FIG. 10 is a sequence diagram illustrating the process by which the mobile application facilitates providing assistance to the user in response to the user selecting an option to request help.

FIG. 10 is a sequence diagram illustrating the process by which the mobile application facilitates providing assistance to the user 180 in response to the user 180 selecting an option to request help.

Steps 302 through 308 proceed as previously described.

Now, however, instead of selecting an access point 56, the user 180 selects, in step 330, an option to send a help request (for example, by pressing and holding down a region of the display 120 containing a graphical element 504, or by selecting a virtual button specifically associated with requesting help).

In step 332, the help request is sent to the control system 102 along with an inferred location of the user 180. The inferred location of the user 180 is determined based on the predictions of which access point 56 will be the next access point 56 engaged by the user, which access point 56 was most recently engaged by the user 180, and/or location information based on positioning information received from the GNSS receiver 216 and/or the local position detector 240. For example, if the user 180 is at position B, the inferred location of the user can be determined to be between access points 56-1 and 56-2, based on the fact that access point 56-2 is determined to be the next access point 56 engaged by the user, and access point 56-1 was recently engaged by the user 180.

In step 334, the help request and inferred location of the user 180 is sent from the control system 102 to the monitoring center 108.

Assistance is then provided to the user in step 336 in response to the monitoring center 108 receiving the help request. For example, security or maintenance personnel can be dispatched to the user's 180 location, or video surveillance can be initiated to capture the inferred location.

Figure 11:
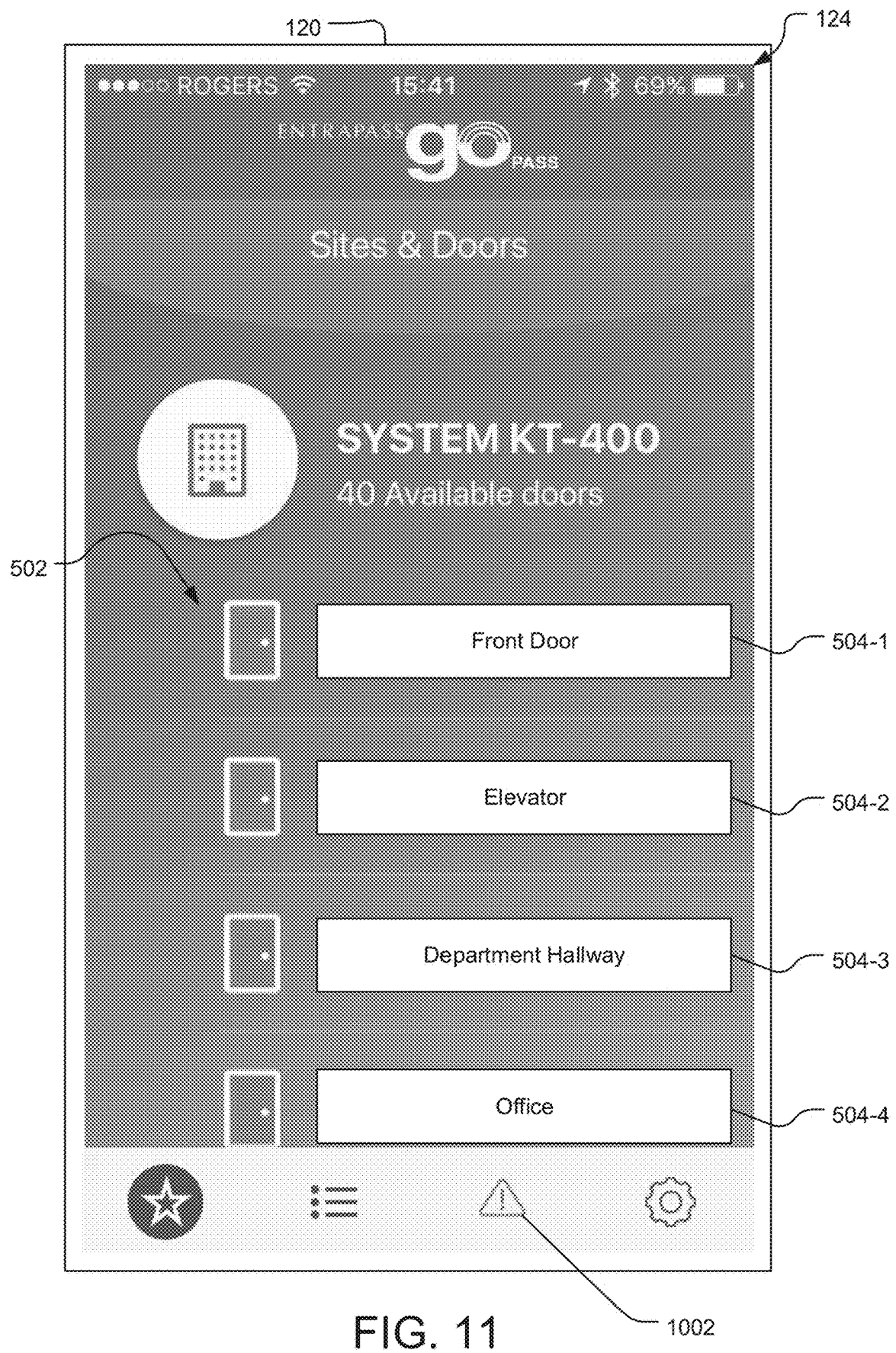
FIG. 11 shows an example of a screen of the graphical user interface including a help request button.

FIG. 11 shows an example of a screen of the GUI 124 including a help request button 1002, which is a virtual button that, when selected, triggers the mobile application 218 to send a help request to the control system 102 along with the inferred location of the user 180. In the illustrated example, selection by the user 180 of the help request button 1002 would result in the monitoring center 108 receiving a help request along with an inferred location indicating position A. This inferred location is based on the determination that access point 56-1 is the most likely access point 56 to be engaged by the user 180, as reflected in the order of graphical elements 504 in the selection pane 502, wherein graphical element 504-1, associated with access point 56-1, is listed first.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for facilitating access by users through doors leading to restricted areas of a building, the system comprising:
a building access control system for controlling access through the doors; and mobile computing devices executing mobile applications and rendering graphical user interfaces on touchscreen displays of the mobile computing devices, the graphical user interfaces indicating available doors and receiving input from the users indicating which doors to engage, wherein the available doors indicated by the graphical user interfaces are prioritized based on predictions of the next doors to be engaged by the users, wherein the predictions are presented by graphical user interfaces rendered on touchscreen displays of the mobile computing devices, and the predictions of the next doors to be engaged by the users are based on which doors were engaged by the users at the same time on previous days and/or which doors were previously engaged by the users at the users' current locations.

2. The system as claimed in claim 1, wherein the predictions of the next doors to be engaged by the users are based on which doors were recently engaged by the users.

3. The system as claimed in claim 1, wherein the mobile computing devices further comprise respective local position detectors for determining the current locations of the users in confluence with a local positioning system.

4. The system as claimed in claim 1, wherein prioritized lists of doors are maintained for the users and are associated with different times and/or potential locations of the users.

5. The system as claimed in claim 4, wherein the prioritized lists of doors are updated in response to the users engaging doors that are not included on the prioritized lists of doors associated with the current times and/or the current locations of the users.

6. The system as claimed in claim 1, wherein the mobile computing devices are smart phones and/or smart watches.

7. The system of claim 1, wherein the graphical user interfaces include selection panes, which present a graphical element corresponding to each of the available doors, the graphical elements appearing in the selection pane sorted by likelihood of the doors to be the next door engaged by the user.

8. The system of claim 7, wherein the selection panes are embedded as widgets on general menu screens displayed by operating systems of the mobile computing devices.

9. The system of claim 1, wherein the predictions of the next doors to be engaged by the users are based on prescribed schedules for the users and prescribed sequences of doors for the users.

10. A system for facilitating access by users through doors leading to restricted areas of a building, the system comprising:
a building access control system for controlling access through the doors; and mobile computing devices executing mobile applications and rendering graphical user interfaces on touchscreen displays of the mobile computing devices, the graphical user interfaces indicating available doors and receiving input from the users indicating which doors to engage, wherein the available doors indicated by the graphical user interfaces are prioritized based on predictions of the next doors to be engaged by the users, the predictions are presented by graphical user interfaces rendered on touchscreen displays of the mobile computing devices, and wherein the predictions of the next doors to be engaged by the users are based on a prescribed schedule or are based on prescribed sequences of doors for the users.

11. The system of claim 10, wherein the prescribed schedule includes a maintenance schedule for the building, security events generated by the access control system or a connected security system, and/or a conference room registration schedule for the building.

12. A system for facilitating access by users through doors leading to restricted areas of a building, the system comprising:
a building access control system for controlling access through the doors; and
mobile computing devices executing mobile applications and rendering graphical user interfaces on touchscreen displays of the mobile computing devices, the graphical user interfaces indicating available doors and receiving input from the users indicating which doors to engage, wherein the available doors indicated by the graphical user interfaces are prioritized based on predictions of the next doors to be engaged by the users, the predictions are presented by graphical user interfaces rendered on touchscreen displays of the mobile computing devices, and the graphical user interfaces comprise selection panes for displaying graphical elements associated with the available doors, wherein graphical elements associated with doors predicted with higher levels of confidence to be the next doors to be engaged by the users are displayed closer to the top of the selection panes, and graphical elements associated with doors predicted with lower levels of confidence to be the next doors to be engaged by the users are displayed closer to the bottom of the selection panes.

13. The system as claimed in claim 12, wherein graphical elements associated with doors predicted with the highest levels of confidence to be the next doors to be engaged by the users are the only graphical elements included in the selection panes.

14. The system as claimed in claim 12, wherein the graphical elements include icons and/or text identifying the doors associated with the graphical elements.

15. A method for facilitating access by users through doors leading to restricted areas of a building, the method comprising:
mobile applications executing on mobile computing devices displaying graphical user interfaces touchscreen displays indicating doors available to the users, wherein the doors are prioritized based on predictions of the next doors of the building to be engaged by the users, wherein the predictions are presented by the graphical user interfaces rendered on the touchscreen displays of the mobile computing devices;
the mobile applications detecting selections by the users of which doors to engage and sending the selections to an access control system; and
the access control system controlling access through the doors,
wherein the predictions of the next doors to be engaged by the users are based on which doors were engaged by the users at the same time on previous days and/or which doors were previously engaged by the users at the users' current locations.

16. The method as claimed in claim 15, further comprising basing the predictions of the next doors to be engaged by the users on which doors were recently engaged by the users.

17. The method as claimed in claim 15, further comprising determining the current locations of the users via local position detectors of the mobile computing devices in confluence with a local positioning system.

18. The method as claimed in claim 15, further comprising maintaining prioritized lists of doors for the users, wherein the prioritized lists are associated with different times of the day and/or potential locations of the users.

19. The method as claimed in claim 18, further comprising updating the prioritized lists of doors in response to the users engaging doors that are not included on the prioritized lists of doors associated with the current times of the day and/or the current locations of the users.

20. The method as claimed in claim 15, further comprising basing the predictions of the next doors to be engaged by the users on a prescribed schedule.

21. The method as claimed in claim 15, further comprising basing the predictions of the next doors to be engaged by the users on prescribed sequences of doors for the users.

22. The method as claimed in claim 15, further comprising the graphical user interfaces displaying in selection panes graphical elements associated with the available doors, wherein graphical elements associated with doors predicted with higher levels of confidence to be the next doors to be engaged by the users are displayed closer to the top of the selection panes, and graphical elements associated with doors predicted with lower levels of confidence to be the next doors to be engaged by the users are displayed closer to the bottom of the selection panes.

23. The method as claimed in claim 22, further comprising the selection pane displaying graphical elements associated with doors predicted with the highest levels of confidence to be the next doors to be engaged by the users as the only graphical elements included in the selection panes.

24. The method as claimed in claim 23, wherein the graphical elements include icons and/or text identifying the doors associated with the graphical elements.

25. The method as claimed in claim 15, wherein the mobile computing devices are smart phones and/or smart watches.

26. A method for facilitating access by users through doors leading to restricted areas of a building, the method comprising:
mobile applications executing on mobile computing devices displaying graphical user interfaces indicating doors through which the users can pass, wherein the doors are prioritized based on predictions of the next door to be engaged by the users, wherein the predictions are presented by the mobile computing devices;
the mobile applications detecting selections by the users of which door to engage and sending the selections to an access control system; and
the access control system controlling access through the doors,
wherein the predictions of the next doors to be engaged by the users are based on which doors were engaged by the users at the same time on previous days and/or which doors were previously engaged by the users at the users' current locations.

27. The system of claim 1, wherein the input includes selections by the users of available doors indicated by the graphical user interfaces, and the building access control system controls the access through the doors by unlocking the selected doors in response to determining that the users are authorized to access the selected doors.

28. The system of claim 1, wherein particular doors indicated by the graphical user interfaces are promoted or demoted in priority based on changes in confidence levels of predictions that the particular doors will be the next doors to be engaged by the users.

29. The system of claim 28, wherein doors that were recently engaged by the user are demoted in priority, indicating a lower likelihood of being the next door to be engaged.

\* \* \* \* \*